United States Patent [19]

Kornas

[11] Patent Number: 5,065,790

[45] Date of Patent: Nov. 19, 1991

[54] CHECK VALVE

[75] Inventor: Christof Kornas, Wiesbaden, Fed. Rep. of Germany

[73] Assignee: Alfred Teves GmbH, Frankfurt am Main, Fed. Rep. of Germany

[21] Appl. No.: 585,442

[22] Filed: Sep. 20, 1990

[30] Foreign Application Priority Data

Sep. 21, 1989 [DE] Fed. Rep. of Germany ....... 3931437

[51] Int. Cl.$^5$ ............................................. F16K 21/10
[52] U.S. Cl. ................................. 137/514.5; 137/536; 137/538; 137/539; 137/543.19
[58] Field of Search ............ 137/536, 538, 539, 515.5, 137/514.5, 543.19, 539.5, 533.11, 533.13

[56] References Cited

U.S. PATENT DOCUMENTS

| 1,754,975 | 4/1930 | Andersen | 137/514.5 |
| 1,796,455 | 3/1931 | Gunn et al. | 137/515.5 |
| 1,901,217 | 3/1933 | Yerkes et al. | 137/533.13 |
| 2,339,101 | 1/1944 | Parker | 137/514.5 |
| 2,969,085 | 1/1961 | Nystrom et al. | 137/515.5 X |
| 3,356,103 | 12/1967 | Biello et al. | 137/536 X |
| 3,605,802 | 9/1971 | Hertell | 137/514.5 |
| 3,787,149 | 1/1974 | Dane et al. | 137/533.11 X |
| 4,700,741 | 10/1987 | Murphy | 137/539 X |

FOREIGN PATENT DOCUMENTS

| 227358 | 6/1959 | Australia | 137/543.19 |
| 217304 | 9/1961 | Austria | 137/539 |
| 2471536 | 6/1981 | France | 137/543.19 |

Primary Examiner—John Rivell
Attorney, Agent, or Firm—Robert P. Seitter; J. Gordon Lewis

[57] ABSTRACT

A pneumatic check valve includes valve connections having a common axis of symmetry and a valve body at least partially guided in a droplet-shaped member disposed between the two connections to substantially eliminate flow and restriction losses occurring during operation.

25 Claims, 3 Drawing Sheets

CHECK VALVE

TECHNICAL FIELD

The present invention relates to a check valve, especially for use with a vacuum brake force booster, which is located in the connection between a vacuum source and the vacuum brake force booster and which, preferably, includes a bipartite housing provided with two connections, a sealing seat formed on one of the connections and a valve body cooperating with the sealing seat and, through a spring, being preloaded in the closing direction of the valve.

BACKGROUND OF THE INVENTION

A check valve of the afore-described type is disclosed, for example, by German published patent application 31 47 708. The connections of the prior known check valve are disposed in a direction vertical relative to one another, with the valve body thereof being formed by a resilient, circular plate disposed within a spring retainer guided in the housing in the direction of actuation of the valve and serving to support a compression spring preloading it in the closing direction of the valve.

Such conventional check valves have a disadvantage in that substantial flow losses occur, caused both by the deflection of the flow and by the shape of the valve body. Also disadvantageous is the relatively short guiding length of the valve body and of the spring retainer, respectively, which creates a risk of sticking during operation.

SUMMARY OF THE INVENTION

It is, therefore, the object of the present invention to improve a check valve of the aforementioned type by substantially eliminating the flow and restriction losses inherent in such check valves. At the same time, enhanced operating safety is insured by providing maximum guidance for the valve body. The check valve is intended to be efficient in structural design, easy to manufacture in series production, and composed of parts permitting a low-cost manufacture.

The problem of valve body guidance is solved according to the present invention by providing that the connections exhibit a common axis of symmetry and that the valve body, at least in part, is guided in a droplet-shaped member provided between the two connections.

According to a preferred embodiment of the invention, the droplet-shaped member includes at least two holding fins insertable into grooves provided in a housing half, thereby attaining a reliable fixation both in the axial and in the radial direction.

According to another preferred embodiment of the invention, the droplet-shaped member includes a cylindrical chamber accommodating, at least in part, the spring preloading the valve body, with the bottom thereof serving as a bearing face for the spring, and with passageways being provided in the droplet-shaped member that enable the chamber to be evacuated.

During operation of the check valve according to the invention, a force component acting upon the valve body will, hence, be formed to enhance the effect of the air flowing past the valve body and to act against the force of the spring preloading the valve body. This force component thus contributes to further reducing the restriction losses. Preferably the passageways and the axis of symmetry of the housing define an angle in the range between 0° and 90°.

According to another feature of the invention, the valve body is of a mushroom-shaped configuration, exhibiting a guiding shaft protruding into the chamber and being, in part, embraced by the spring, thereby providing a configuration of the check valve of particularly favorable flow conditions, at the same time improving the guidance of the valve body to preclude the sticking risk.

An efficient separation of the flow space of the check valve formed within the housing from the chamber, according to another embodiment of the invention, is attained in that the valve body exhibits an axially extending annular recess which, in the operating position, accommodates a guiding shoulder formed on the droplet-shaped member.

To attain enhanced guiding properties of the valve body, the body is formed, according to another advantageous embodiment of the invention, by a rigid cylindrical sleeve which, in part, accommodates the spring and is guided through the wall of the chamber.

According to another feature of the invention, favorable manufacturing tolerances are achieved by a resilient design of the sealing seat, in that the sealing seat is formed by an O-ring or lip-type ring disposed in a recess within the housing.

According to another embodiment of the invention, the sleeve, on the end thereof facing away from the droplet-shaped member, is provided with a sealing cone of flexible material snapped into a peripheral groove and exhibiting a sealing face cooperating with an annular face formed on the droplet-shaped member. The afore-described features insure both a substantially simplified assembly and an enhanced operating safety.

According to still another embodiment of the invention, the check valve is modified so that the sleeve, at the end thereof facing away from the droplet-shaped member, exhibits a conical sealing face, thereby attaining an efficient centering of the valve body in the sealing seat.

A compact embodiment of the invention that permits a low-cost manufacture provides for the formation of the holding fins integral with the droplet-shaped member.

An increased air flow speed in the flow space of the check valve and an increased vacuum in the chamber during operation are attained, according to the invention, by restricting the flow cross-section of the valve in the area of the passageways.

Further features, advantages, and capabilities of the present invention will become manifest from the following description of four embodiments with reference to the enclosed drawing, wherein:

DETAILED DESCRIPTION OF THE INVENTION

Figure 1:
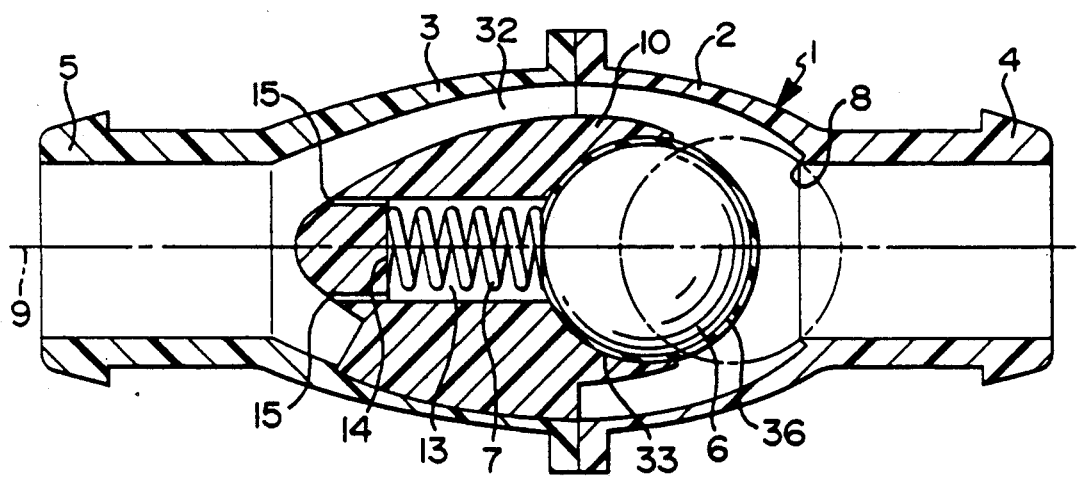
FIG. 1 shows an axial section of a first embodiment of the check valve according to the invention.
Figure 2:
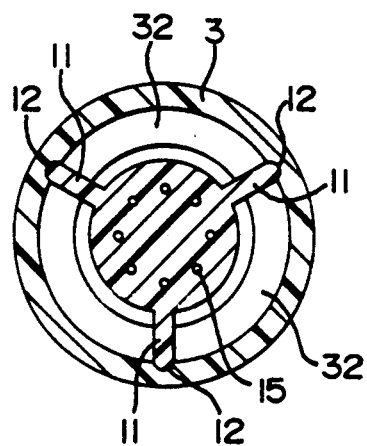
FIG. 2 is a cross-sectional view of the check valve shown in FIG. 1 taken along line A—A of FIG. 1.

The check valve as shown in FIGS. 1 and 2 includes a housing 1 with two housing halves 2 and 3, preferably made of plastic material; undetachably joined, for example, by cementing, welding, or riveting; and interconnected in a plane perpendicular to the axis of symmetry 9 of the housing 1. Each of the housing halves 2, 3 is provided with a pneumatic connection 4, 5 establishing a communication between the check valve designed in accordance with the invention and a vacuum user and a vacuum source, respectively.

The housing half 3 as shown in FIG. 1 is provided, as especially shown by FIG. 2 with three grooves 12 which, in the internal wall of housing half 3, are staggered with respect to one another by 120°. The grooves 12 accommodate holding fins 11 of a member 10 preferably of a droplet-shaped configuration which, in the interior of housing 1, defines a flow space 32. The droplet-shaped member 10, at the end thereof facing the vacuum user-sided connection 4, has a recess 33 which, in cross-section, is of a circular-segmented configuration, serving, in the operating position, to accommodate a valve body 6. The valve body 6, which can be formed as a solid ball of flexible material or as a rigid body of spherical configuration provided with a resilient coating 36 or with a conical shape, cooperates with a sealing seat 8 formed on connection 4 in that, in the resting position, it is forced against the sealing seat 8 by a compression spring 7. The compression spring 7 is provided in a cylindrical chamber 13 formed in the droplet-shaped member 10, and is supported on the bottom 14 of chamber 13. The chamber 13, through a plurality of passageways 15 formed in the member 10, equidistant from the axis of symmetry 9, communicates with the flow space 32. The function of the passageways will be described in greater detail below.

Figure 3:
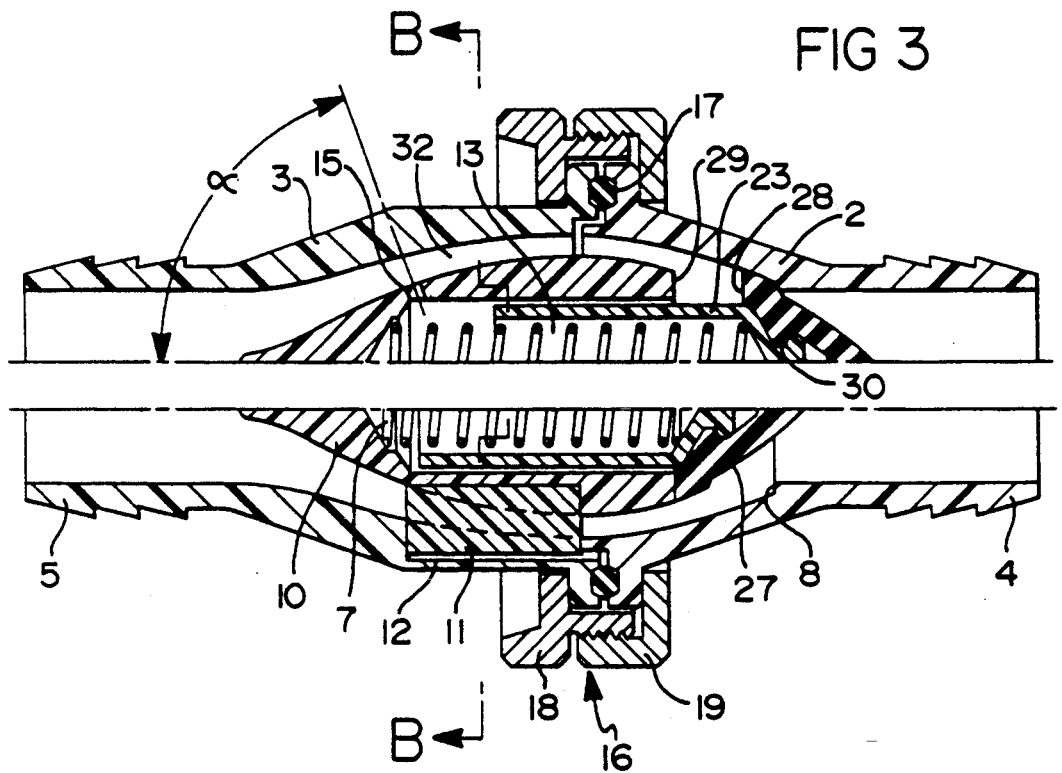
FIG. 3 is an illustration of a second embodiment of the check valve according to the invention.
Figure 4:
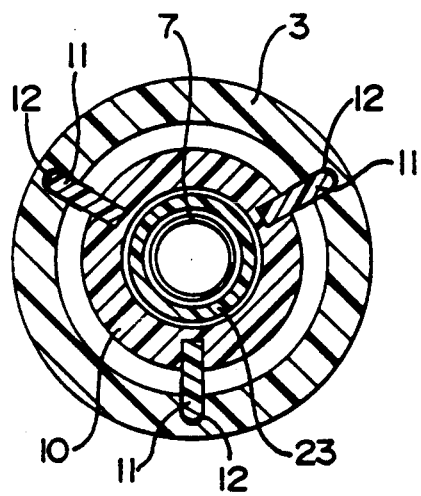
FIG. 4 is a cross-sectional view of the check valve according to FIG. 3 taken along line B—B of FIG. 3.

In a second embodiment of the invention as shown in FIGS. 3 and 4, the two housing halves 2 and 3 are detachably interconnected, with a sealant 17 being provided therebetween. The connection is established through a bipartite locking ring 16, the ring halves 18 and 19 of which are connected by screwing to force the two housing halves 2 and 3 together. As especially shown in FIG. 3, the valve body 6 is formed by a rigid sleeve 23 axially guided in chamber 13, with the end of such sleeve protruding from the droplet-shaped member 10 being provided with a circumferential groove 30 into which a sealing cone 27, preferably made of flexible material, is snapped. The sealing cone 27, on the front side thereof facing away from the sealing seat 8, exhibits a sealing face 28 which, in the operating position, is in abutment with an annular face 29 formed on the droplet-shaped member 10. A part of spring 7 is accommodated in the interior of sleeve 23. Both the axial and the radial fixation of the droplet-shaped member 10 within housing 1 is insured by holding fins 11 which, in the example as shown, are manufactured separately from the droplet-shaped member 10 and are cemented thereto and to the housing half 3. The passageways 15 connecting the chamber 13 to the flow space 32, in the embodiment as shown in FIG. 3, and the axis of symmetry 9 define an angle ($\alpha$) ranging between 0° (see FIG. 1) and 90°.

The method of operation of the check valve constructed according to the invention will be described with reference to the example of the embodiment as shown in FIGS. 3 and 4. It is assumed that the check valve is placed between the vacuum source (not shown) and the brake force booster (not shown) so that connection 4 is associated with the brake force booster and connection 5 is associated with the vacuum source. Valve body 6 is located in the resting position shown in the upper half of FIG. 3 such that the pneumatic communication between the vacuum source and the brake force booster is discontinued (with the sealing cone 27 sealingly conforming to the sealing seat 8). When rendering the vacuum source operative, a pneumatic pressure difference will arise between the vacuum source and the brake force booster to overcome the spring force of spring 7 acting in the closing direction to cause the valve body 6 to lift off the sealing seat 8 and to allow air to flow past the valve body 6 and the droplet-shaped member 10, respectively, from the right to the left. The sealing face 28 on the sealing cone 27 will abut the sealing face 29 of the droplet-shaped member 10 (see the bottom half of FIG. 3) so that the flow space 32 is separated from the chamber 13 accommodating the spring 7. The air flowing past the passageways 15 causes a static vacuum to develop in the passageways 15, which propagates into chamber 13. The pressure difference generated on either side of the valve body 6 causes the body 6 to be kept in position, opening the full flow cross-section without restricting the air flow.

Figure 5:
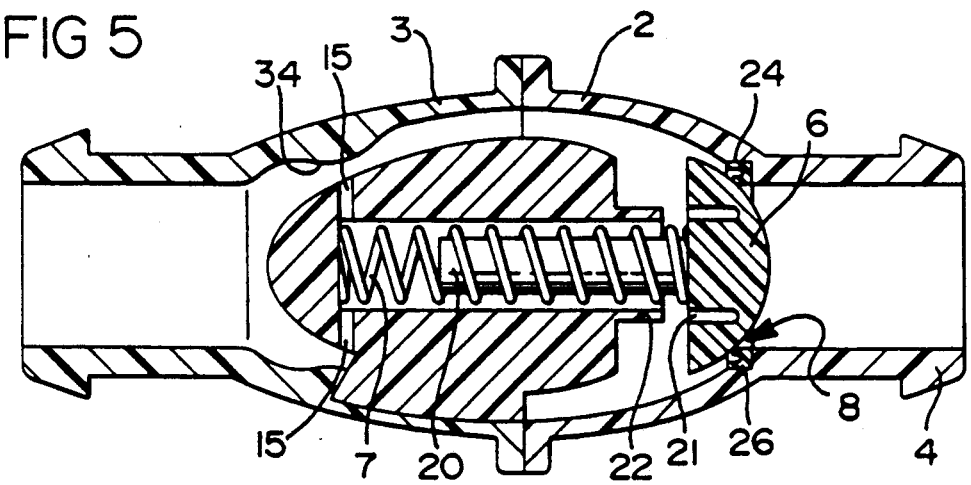
FIG. 5 is an illustration of a third embodiment of the check valve according to the invention.

In a third embodiment of the invention as shown in FIG. 5, the valve body 6 is of a mushroom-type configuration, cooperating with a lip ring 26 forming the sealing seat 8 and being disposed in recess 24 formed in the housing half 2. The valve body 6 includes a guiding shaft 20 protruding into the chamber 13 provided in the droplet-shaped member 10 and, in part, being embraced by spring 7.

The droplet-shaped member 10, on the front face thereof facing the sealing seat 8, is provided with an axial guide shoulder 22 which, in the operative position, is accommodated by an annular recess 21 formed in the valve body 6. The inner wall of the housing half 3, in the area of the outlet of the passageways 15, is provided with a radial peripheral projection 34 restricting the flow cross-section in that area thereby increasing the rate of the air flow and, hence, the vacuum prevailing in the chamber 13.

Figure 6:
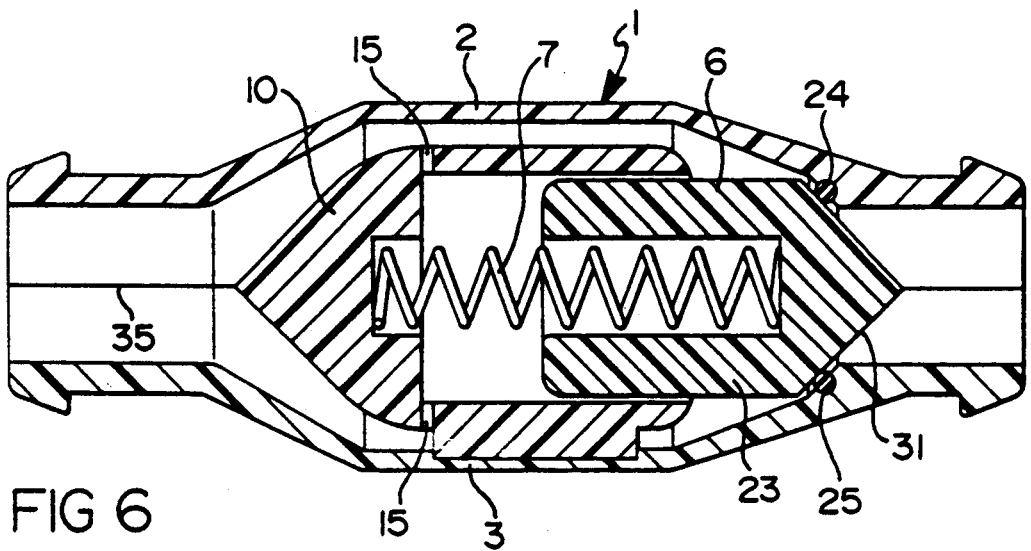
FIG. 6 is an illustration of a fourth embodiment of the check valve according to the invention.

In the embodiment shown in FIG. 6, the sleeve 23 forming the valve body 6, at the end thereof protruding from the droplet-shaped member 10, is provided with a conical sealing face 31 cooperating with a flexible O-ring 25 inserted into recess 24. The housing 1 of the check valve according to the invention, in this embodiment, is of a longitudinally divided configuration, i.e. its division is along a separation plane 35.

What is claimed is:
1. A check valve comprising:
 a housing having:
  (a) an inside wall including a plurality of grooves,
  (b) a first opening adapted for connection to a vacuum source, and
  (c) a second opening adapted for connection to a vacuum user,
 said first and said second openings having a common axis;
  a guide member within said housing and fixed to said housing between said first and said second open- ings, said guide member having a corresponding plurality of radial fins fitted within said grooves in said inside wall of said housing and having a recess at an end thereof facing said second opening;

a sealing seat formed in said housing at said second opening;

a valve body movable toward and away from said sealing seat and guided for at least part of its movement within said recess;

and a spring within said housing urging said valve body toward said sealing seat.

2. A check valve according to claim 1 wherein said housing is composed of two parts.

3. A check valve according to claim 2 wherein said housing is divided along the longitudinal axis of said housing.

4. A check valve according to claim 2 wherein said housing is divided transverse to the longitudinal axis of said housing.

5. A check valve according to claim 1 wherein said guide member has a droplet shape.

6. A check valve according to claim 1 wherein said guide member has a closed-end chamber which opens into said recess and said spring is positioned within said closed-end chamber with a first end of said spring bearing against the closed end of said closed-end chamber and a second end of said spring bearing against said valve body.

7. A check valve according to claim 6 wherein said guide member has a plurality of passageways extending from said closed-end chamber to the outside surface of said guide member.

8. A check valve according to claim 7 wherein said passageways extend at an angle within the range of 0° to 90° relative to the longitudinal axis of said housing.

9. A check valve according to claim 2 wherein said housing parts are rigidly attached to each other.

10. A check valve according to claim 2 wherein said housing parts are detachably attached to each other.

11. A check valve according to claim 6 wherein said valve body is spherical.

12. A check valve according to claim 11 wherein said valve body is a rigid body having a flexible coating.

13. A check valve according to claim 6 wherein said spring is a coil spring and said valve body is mushroom shaped and has a guide stem which extends into said coil spring.

14. A check valve according to claim 13 wherein said guide member has an annular shoulder which extends along the longitudinal axis of said housing and said valve body has an annular recess which receives said annular shoulder as said valve body moves away from said sealing seat.

15. A check valve according to claim 6 wherein said valve body is in the form of a rigid cylindrical sleeve into which said spring extends.

16. A check valve according to claim 6 wherein said valve seat includes an annular recess in said housing and an O-ring fitted within said annular recess.

17. A check valve according to claim 6 wherein said valve seat includes an annular recess in said housing and a lip ring fitted within said annular recess.

18. A check valve according to claim 15 wherein said cylindrical sleeve has a conical end of resilient material facing said sealing seat.

19. A check valve according to claim 18 wherein said cylindrical sleeve has an annular recess and said resilient material has an annular ridge which is received by said annular recess in said cylindrical sleeve to attach said resilient material to said cylindrical sleeve.

20. A check valve according to claim 19 wherein said resilient material has an annular sealing face and said guide member has an annular shoulder against which said annular sealing face of said resilient material abuts as said valve body moves away from said sealing seat.

21. A check valve according to claim 6 wherein the surface of said valve body facing said seating seal is conical.

22. A check valve according to claim 1 wherein said radial fins are integrally formed with the remainder of said guide member.

23. A check valve according to claim 7 wherein the space between the inside walls of said housing and the outside surface of said guide member in the vicinity of said passageways is less than the space between the inside walls of said housing and the outside surface of said guide member elsewhere.

24. A check valve according to claim 10 further including: (a) a sealing ring positioned between adjacent faces of said housing parts, and (b) a locking ring holding said housing parts together.

25. A check valve according to claim 24 wherein said locking ring includes two ring halves which are in the threaded engagement.

* * * * *